Nov. 20, 1956  J. N. LYNDALL ET AL  2,771,003
MAGNIFYING GLASS ARRANGEMENT
Filed March 4, 1954
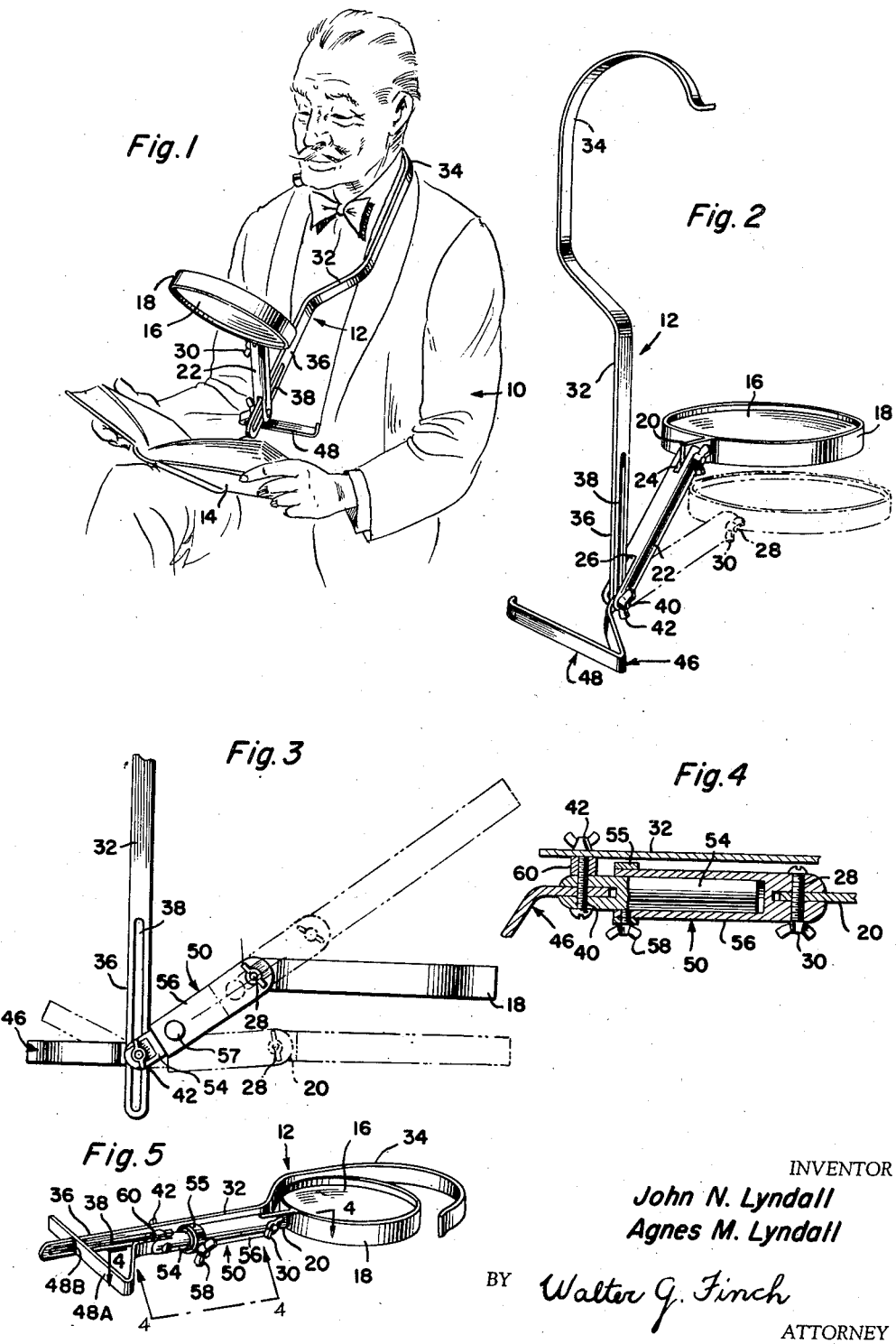
INVENTOR
John N. Lyndall
Agnes M. Lyndall
BY Walter G. Finch
ATTORNEY

# United States Patent Office 2,771,003
Patented Nov. 20, 1956

2,771,003

MAGNIFYING GLASS ARRANGEMENT

John N. Lyndall and Agnes M. Lyndall, Wyoming, Del.

Application March 4, 1954, Serial No. 414,158

5 Claims. (Cl. 88—39)

This invention relates generally to visual aid apparatus, and more particularly to a magnifying glass arrangement for use by persons having poor vision and the like.

Prior art magnifying glass arrangements have the disadvantages that the magnifying glass is not readily adjustable in various directions by the users thereof. In addition, conventional magnifying glass arrangements are difficult to adjust in order to obtain the proper location of the magnifying glass with respect to the eyes of the user. Even when such magnifying glass arrangements are properly adjusted, difficulty is experienced in keeping the glass in proper operating position because of the failure to provide adequate supports therefor.

It is one of the objects of this invention to provide a unique magnifying glass arrangement in which the magnifying glass is readily adjustable in various directions.

It is another object of this invention to provide a magnifying glass arrangement in which the magnifying glass is supported so that lateral movements thereof with respect to the body of the user are eliminated.

Still another object of this invention is to provide a magnifying glass arrangement in which all adjustments can be rapidly made, and once made the magnifying glass will be retained in its proper operating position.

And another object of this invention is to provide a magnifying glass arrangement which is inexpensive to manufacture, easy and efficient to operate, and which is economical to maintain.

These and other objects of this invention, as well as the attendant advantages thereof, will be readily appreciated as the same becomes better understood by reference to the following detailed description when considered in connection with the single accompanying drawing, and in which:

Fig. 1 is a perspective view of one embodiment of the invention showing the magnifying glass in position on the user thereof;

Fig. 2 is an enlarged perspective view of the embodiment of the invention in Fig. 1 showing the magnifying glass in two different operating positions;

Fig. 3 is a side view of a portion of the magnifying glass arrangement illustrated in Fig. 2, showing a modification thereof with the magnifying glass arranged in various positions;

Fig. 4 is a cross-section taken along line 4—4 of Fig. 5; and

Fig. 5 is a perspective view of a second embodiment of the invention.

In accordance with the invention, a unique magnifying glass arrangement is provided in which a magnifying glass is mounted in a suitable structure, which has means including an arm pivotally mounted to the structure for adjusting the magnifying glass in various planes. Additional means are provided for supporting the magnifying glass about the neck of the user thereof. These means include an arm having a slot provided therein for providing adjustment of the distance between the magnifying glass and the eyes of the user.

A triangular shaped means is pivotally mounted adjacent to said adjusting means for supporting said magnifying glass against the body of the user in such a manner as to eliminate any lateral movements of said magnifying glass, thereby properly maintaining the magnifying glass in proper operating position once it is adjusted to the eyes of the user. In another embodiment of the invention, other means can be provided to cooperate with the adjusting means for adjusting the distance of the magnifying glass from the body of the user. Thus, the magnifying glass can be adjusted to or away from the body of the user, in various planes, or can be adjusted to or away from the eyes of the user in a vertical direction.

Referring now to Fig. 1 of the drawing, there is illustrated a user 10 of the unique magnifying glass arrangement 12 which comprises one embodiment of this invention. User 10, for example, is making use of the magnifying glass arrangement 12 to facilitate the reading of a book, newspaper, or the like, such as illustrated by reference numeral 14.

As shown in Figs. 1 and 2, the arrangement 12 includes a magnifying glass 16, which is mounted in a suitable structure 18, such as a metal rim container. Structure 18 has an extension 20 extending from the rim thereof, such as illustrated in Fig. 2. An arm 22, which has slots at both ends as indicated by 24 and 26, is pivotally mounted to the extension 20 by means of a bolt 28 having a locknut 30, therefor. Thus the magnifying glass is readily adjustable to various positions as indicated in Fig. 2, wherein one of the operating positions is shown in dot-dash lines.

Additional means can be provided for supporting the magnifying glass 16 about the neck of the user 10. These means include an arm 32, which has one of its ends 34 shaped to fit about the neck of the user 10, as indicated in Figs. 1 and 2. The other end 36 of the arm 32 is provided with a slot 38. A second bolt 40 and locknut 42 are provided for mounting the arm 32 to the slotted end 26 of arm 22. Thus by adjusting the position of the slot 38, in the slotted end 26 of the arm 22, it is possible to move the magnifying glass either toward or away from the eyes of the user 10 in the vertical direction.

End 34 of arm 32 prevents the magnifying glass 16 from swaying about the body of the user 10 because arm 32 is formed of metal and is extremely rigid, although it could be formed so that it would be flexible for forming about the neck of the user 10. This could be achieved by selecting a metal that is stiff in the cross-dimension but flexible in the lengthwise dimension.

In order to prevent lateral movements of the magnifying glass 16 about the body of the user 10, suitable means such as a triangular arm member 46 is provided. This arm member 46 is arranged at one end so that it is pivotally mounted to the arm 22 by means of the bolt 40 and the locknut 42. It is to be noted that the flat end 48 of the triangular shaped member 46 rests against the body of the user, and that it can be adjusted to any desired position by the pivotally mounted arrangement described. This is best illustrated in Fig. 3.

In Fig. 3, there is illustrated a modification of the embodiment of the invention in Figs. 1 and 2 in which a telescoping arrangement 50 is provided in the arm 22 for adjusting the position of the magnifying glass either to or away from the body of the user 10. This is achieved by making the arm 22 of tubular members so that one of the members 54 will slide within the other tubular member 56. A lock member, such as a thumbscrew 57, can be provided for holding the tubular members in proper operating position.

The embodiment of the invention illustrated in Figs. 4 and 5 is arranged so that the arm 32 will pass around the lens 16 when the magnifying glass arrangement 12 is not being utilized and is being stored. This is achieved, as best seen in Fig. 4, by placing the arm 32 at a spaced distance from the triangular arm 46 through the use of a spacing collar 60. The locknut 42 and a longer bolt 40 can be utilized to hold and adjust the triangular arm member 46 and arm 32 as previously mentioned.

As shown in Fig. 5, a slot 48B can be provided in the arm portion 48A for receiving the end of the arm 32, thus making it possible to place the entire magnifying glass arrangement 12 in a single plane for storing and shipping purposes.

In the event the wall thickness of the tubular member 56, for the telescoping arrangement 50, of Fig. 3 or 4 is made extremely thin, then a collar 55 should be provided for mounting a lockscrew or the like 58 (Fig. 5), to hold the tubular members 54 and 56 in proper operating position.

In operation, the magnifying glass arrangement 12 is placed about the neck of the user 10 by placing the end 34 of arm 32 as indicated in Fig. 1. By adjusting the locknuts 30 and 42, the magnifying glass 16 can then be placed in proper operating position, and then the locknuts 30 and 42 are tightened. After the magnifying glass is adjusted in both the vertical and horizontal directions, the book 14 can be easily read by the user 10. By adjusting the thumbscrew 57 or the lockscrew 58, in Figs. 3 and 4, respectively, it is possible to move the glass 16 toward or away from the body of the user 10 through the telescoping arrangement 50.

Obviously many modifications and variations of the present invention are possible in light of the above teachings. It is, therefore, to be understood that within the scope of the appended claims the invention may be practiced otherwise than as specifically described.

What is claimed is:

1. A magnifying glass arrangement, comprising, structure including an arm having one end thereof shaped to fit the general contour of the neck of a user, the other end of said arm having a slot provided therein along its longitudinal direction, slidably mounted supporting means in said slot, a magnifying glass, a second arm including structure for adjustably mounting said magnifying glass at one end thereof, with the other end of said second arm being pivotally mounted to said slidably mounted supporting means, a support bar having one end thereof pivotally mounted to said slidably mounted supporting means and so shaped that the other end thereof rests against the body of the user to properly space said magnifying glass to inhibit lateral movement thereof.

2. An arrangement as set forth in claim 1, including structure for spacing said second mentioned arm from said first mentioned arm so that said magnifying glass can be positioned substantially within the shaped end of said first mentioned arm when said magnifying glass arrangement is in an inoperative and stored position.

3. An arrangement as recited in claim 2, the end of said support bar which rests against said body of a user being provided with a recess therein for receiving the slotted end of said first mentioned arm when said magnifying glass arrangement is in an inoperative and stored position, whereby the components of said magnifying glass arrangement can be located in a single plane for storing and shipping purposes.

4. An arrangement as set forth in claim 1, wherein said second mentioned arm includes adjustable means for varying the position of said magnifying glass from the body of said user.

5. An arrangement as set forth in claim 4, wherein said adjustable means comprise a pair of telescoping tubular members and a member for locking said tubular members in position.

References Cited in the file of this patent
UNITED STATES PATENTS

| | | |
|---|---|---|
| 896,269 | Birdwell | Aug. 18, 1908 |
| 1,130,689 | Atkinson | Mar. 2, 1915 |
| 2,327,096 | Dann | Aug. 17, 1943 |